US012123391B2

(12) United States Patent
Akhter et al.

(10) Patent No.: US 12,123,391 B2
(45) Date of Patent: Oct. 22, 2024

(54) WIND TURBINE BLADE HAVING AIR PASSAGE WITH AIR CLEANING MEMBER

(71) Applicant: UNITED ARAB EMIRATES UNIVERSITY, Al-Ain (AE)

(72) Inventors: Md. Zishan Akhter, Al-Ain (AE); Farag Khalifa Omar, Al-Ain (AE)

(73) Assignee: UNITED ARAB EMIRATES UNIVERSITY (AE)

( * ) Notice: Subject to any disclaimer, the term of this patent is extended or adjusted under 35 U.S.C. 154(b) by 0 days.

(21) Appl. No.: 18/152,335

(22) Filed: Jan. 10, 2023

(65) Prior Publication Data

US 2024/0229761 A1 Jul. 11, 2024

(51) Int. Cl.
*F03D 1/06* (2006.01)
*F03D 80/00* (2016.01)
*F03D 80/55* (2016.01)

(52) U.S. Cl.
CPC ........... *F03D 1/0675* (2013.01); *F03D 80/00* (2016.05); *F03D 80/55* (2016.05); *F05B 2240/30* (2013.01)

(58) Field of Classification Search
CPC ...... F03D 80/00; F03D 1/0633; F03D 1/0641; F03D 1/0675; F03D 1/0683; F03D 1/065; F03D 1/0608; F03D 3/061; F04D 25/088; B64C 21/02; B64C 21/025; B64C 2230/60
See application file for complete search history.

(56) References Cited

U.S. PATENT DOCUMENTS

| 4,285,636 | A | * | 8/1981 | Kato | F01D 5/141 416/119 |
| 4,913,670 | A | | 4/1990 | Spranger | |
| 5,341,565 | A | * | 8/1994 | Kuryliw | F24F 13/28 29/889.721 |
| 5,562,412 | A | * | 10/1996 | Antonelli | F04D 29/703 416/62 |
| 6,733,239 | B2 | * | 5/2004 | Lee | F04D 29/388 416/62 |
| 6,994,522 | B1 | * | 2/2006 | Chin-Chih | F04D 29/388 55/467 |
| 7,832,689 | B2 | * | 11/2010 | Prince | F03D 1/0641 244/200.1 |
| 8,246,311 | B2 | * | 8/2012 | Pesetsky | F03D 1/06 416/90 R |

(Continued)

FOREIGN PATENT DOCUMENTS

CN 202991344 A 6/2013
CN 103912444 A 7/2014
(Continued)

OTHER PUBLICATIONS

NPL Innovations Report; Rainer Klose, "The Cold-Start Dilemma", Feb. 27, 2020, published by EMPA; (Year: 2020).*

(Continued)

*Primary Examiner* — Woody A Lee, Jr.
*Assistant Examiner* — Wesley Le Fisher
(74) *Attorney, Agent, or Firm* — Winthrop & Weinstine, P.A.

(57) ABSTRACT

A wind turbine blade having a body having a pressure surface and a suction surface; the wind turbine blade further comprising: an air passage traversing the body, the air passage having an entrance opening and an exit opening; and an air cleaning member provided within the air passage.

18 Claims, 11 Drawing Sheets

(56) References Cited

U.S. PATENT DOCUMENTS

| | | | |
|---|---|---|---|
| 10,253,754 B2 * | 4/2019 | Aga | F03D 3/005 |
| 10,914,321 B2 * | 2/2021 | Beznoska | F04D 29/388 |
| 11,231,051 B2 * | 1/2022 | Sato | F04B 37/00 |
| 11,415,100 B2 * | 8/2022 | Altmikus | F03D 1/0683 |
| 2006/0245928 A1 | 11/2006 | Herbst | |
| 2008/0232973 A1 | 9/2008 | Ferman | |
| 2009/0035135 A1 | 2/2009 | Martinez Penades | |
| 2009/0173834 A1 * | 7/2009 | Prince | B64C 23/06 244/198 |
| 2009/0220348 A1 | 9/2009 | Routier | |
| 2010/0143122 A1 | 6/2010 | Nies et al. | |
| 2010/0260603 A1 | 10/2010 | Dawson et al. | |
| 2012/0134846 A1 | 5/2012 | Sato et al. | |
| 2012/0189455 A1 | 7/2012 | Enevoldsen et al. | |
| 2013/0259689 A1 | 10/2013 | Eisenberg et al. | |
| 2014/0119943 A1 | 5/2014 | Tarczy et al. | |
| 2014/0193256 A1 | 7/2014 | Matsuda et al. | |
| 2017/0284363 A1 | 10/2017 | Harrison | |
| 2018/0340513 A1 * | 11/2018 | Aga | B01D 46/00 |
| 2021/0381486 A1 | 12/2021 | Juarez | |

FOREIGN PATENT DOCUMENTS

| | | | | |
|---|---|---|---|---|
| CN | 203939632 U | | 11/2014 | |
| CN | 204140288 U | | 2/2015 | |
| CN | 105569740 A | | 5/2016 | |
| CN | 105697229 A | | 6/2016 | |
| CN | 106247443 A | * | 12/2016 | A01M 1/20 |
| CN | 106677982 A | | 5/2017 | |
| CN | 107587974 A | | 1/2018 | |
| CN | 108506158 A | | 9/2018 | |
| CN | 108561268 A | | 9/2018 | |
| CN | 109185045 A | | 1/2019 | |
| CN | 110761940 A | | 2/2020 | |
| CN | 111322198 A | | 6/2020 | |
| CN | 210859043 U | | 6/2020 | |
| CN | 211474328 U | * | 9/2020 | |
| CN | 112031991 A | | 12/2020 | |
| CN | 113700596 A | | 11/2021 | |
| CN | 113958453 A | | 1/2022 | |
| CN | 114658594 A | | 6/2022 | |
| DE | 102012015353 A1 | * | 2/2014 | F03D 1/0675 |
| EP | 0937893 A2 | | 8/1999 | |
| EP | 1561008 A1 | | 8/2005 | |
| EP | 2425128 A1 | | 3/2012 | |
| GB | 2600935 A | * | 5/2022 | F01N 3/2086 |
| KR | 20020005524 A | | 1/2002 | |
| KR | 20020045599 A | | 6/2002 | |
| TW | 463885 U | * | 11/2001 | |
| WO | WO-2007035758 A1 | * | 3/2007 | F03D 1/0633 |
| WO | WO-2023059504 A1 | * | 4/2023 | |

OTHER PUBLICATIONS

NPL Science Daily; Vienna niversity of Technology, "Catalytic converters like it hot"; Oct. 8, 2012; published in ScienceDaily; (Year: 2012).*
English translation of DE102012015353A1 (Year: 2014).*
English translation of CN211474328U (Year: 2020).*
English translation of CN-106247443-A (Year: 2016).*
English Translation of TW-463885-U (Year: 2001).*

* cited by examiner

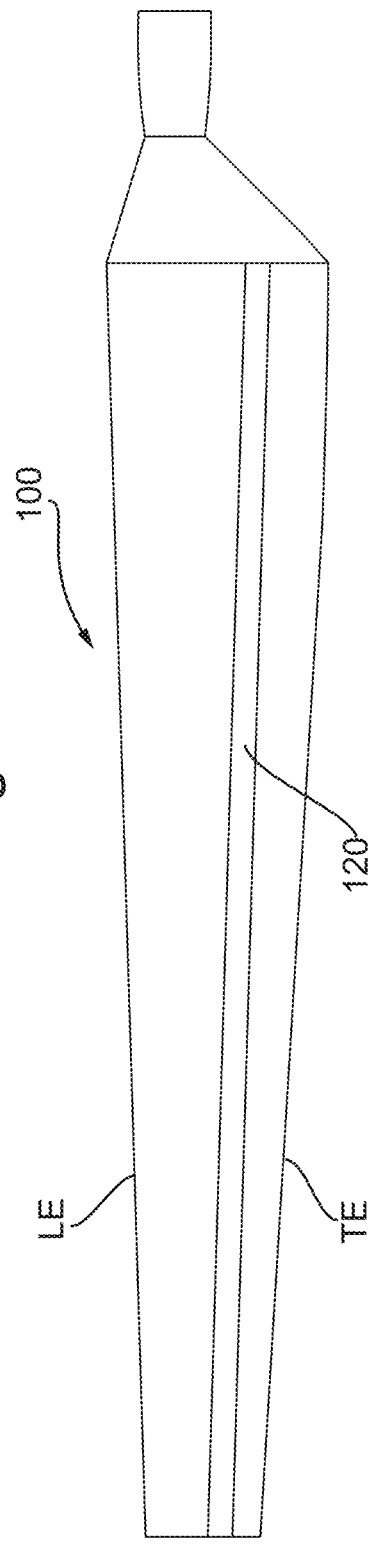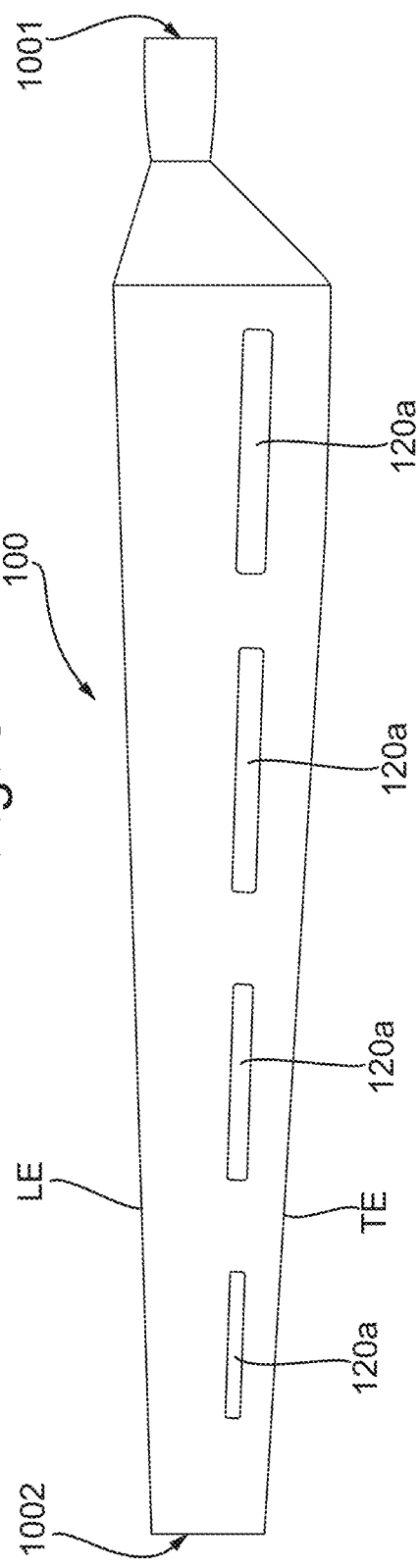

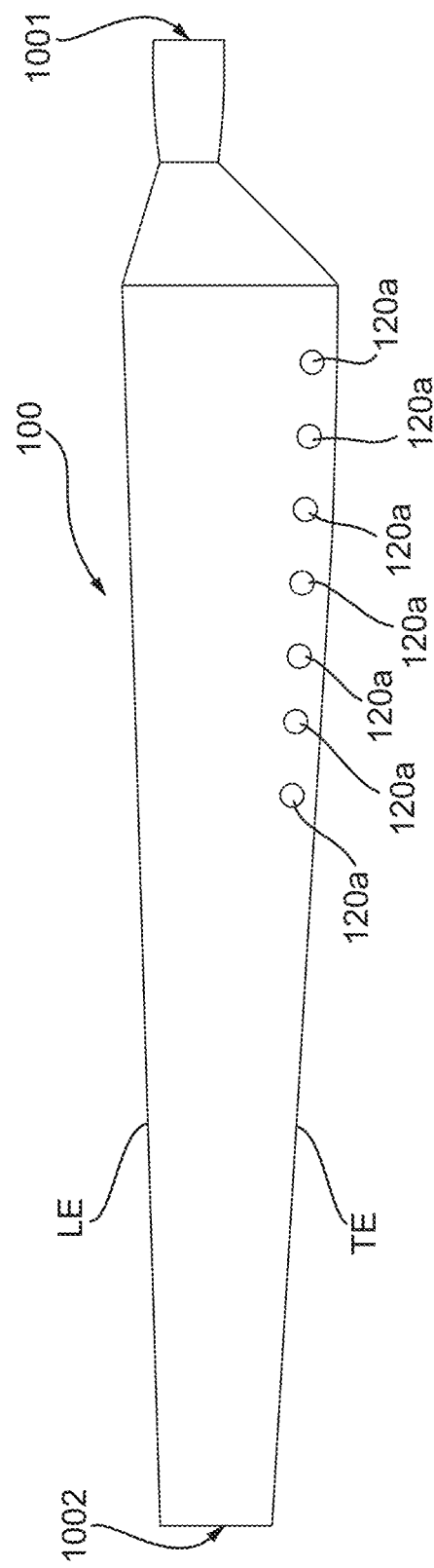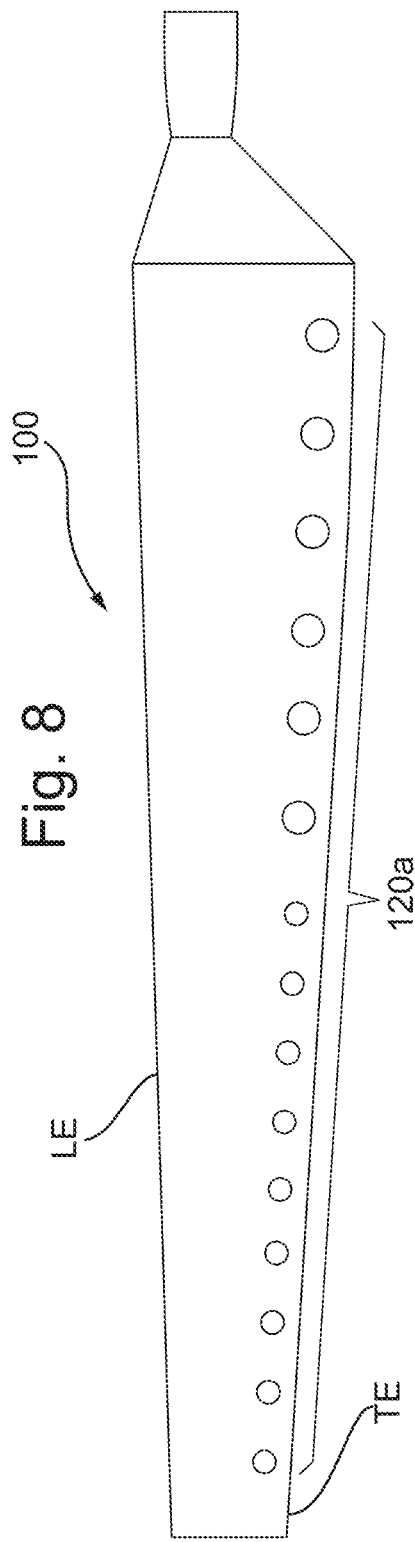

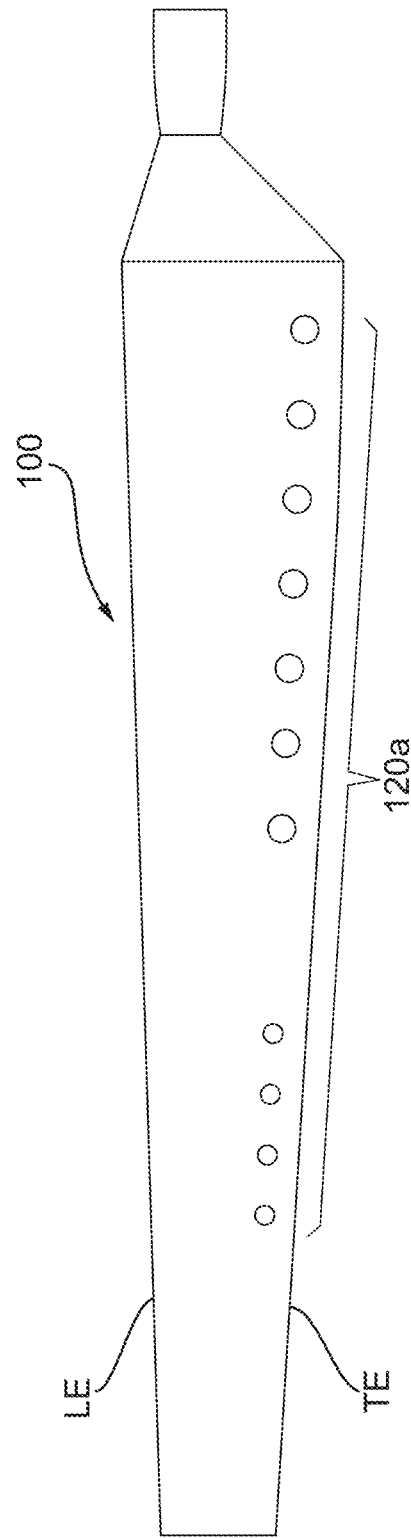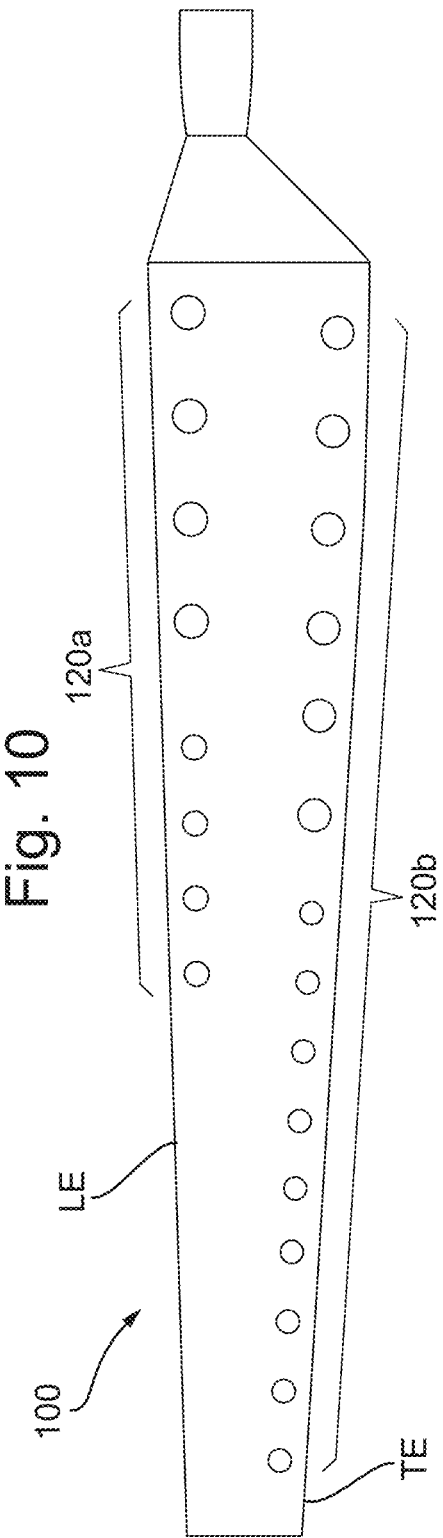

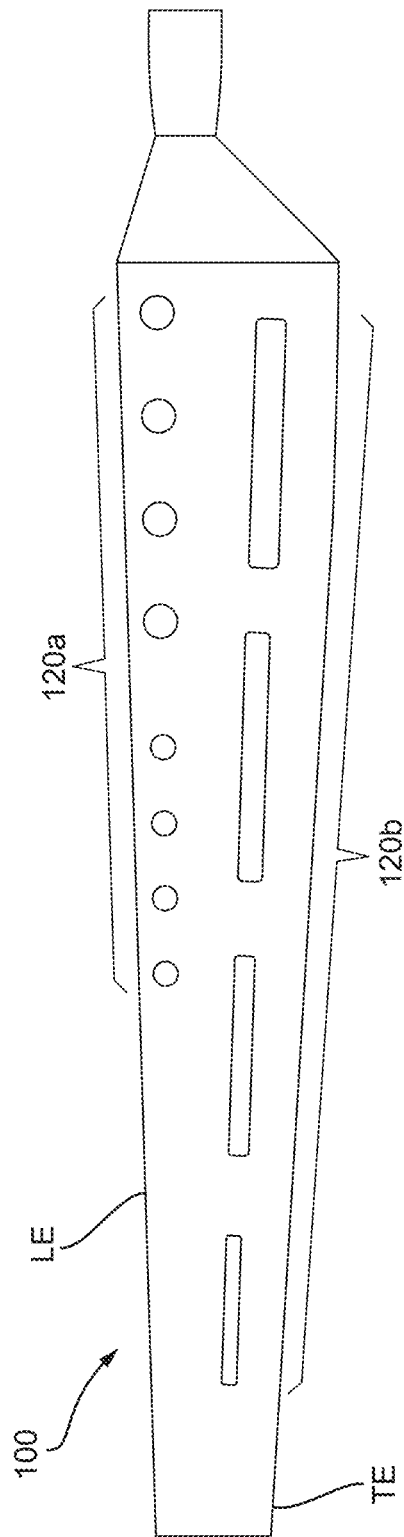
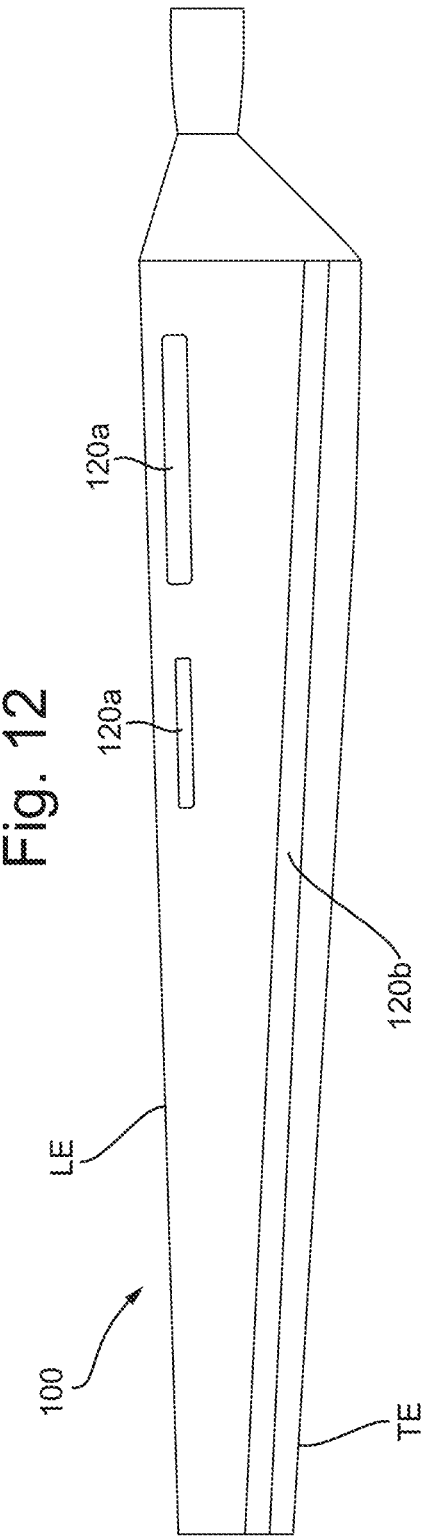

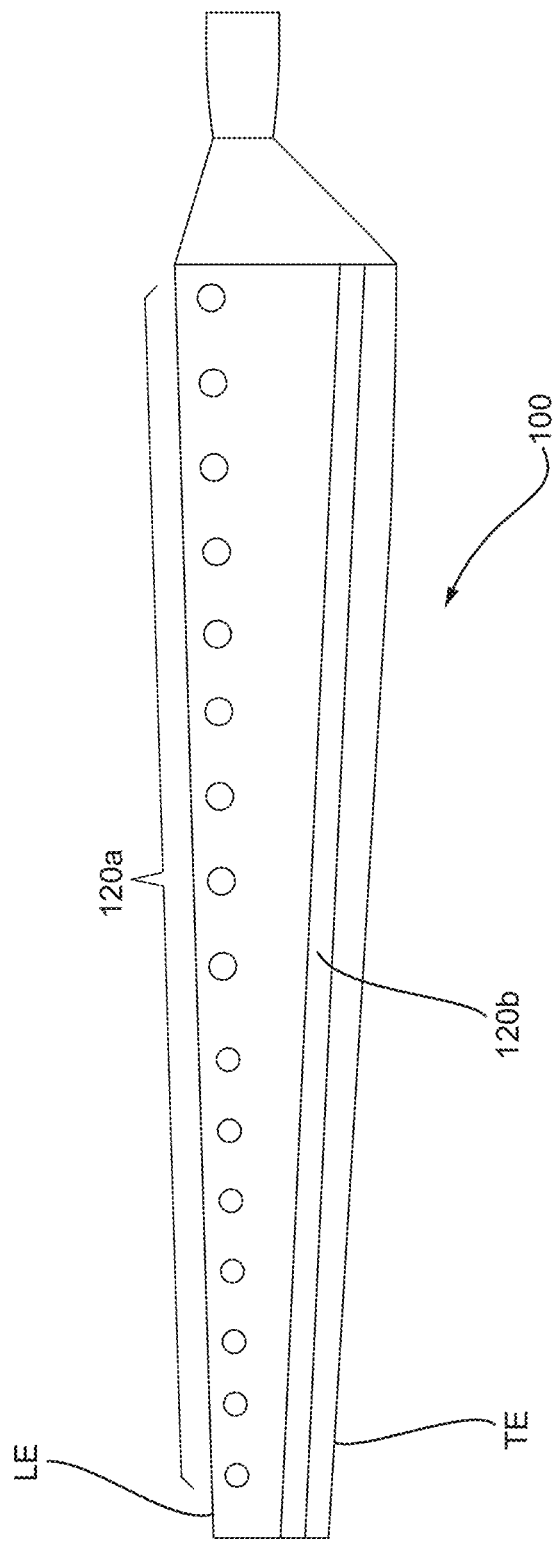

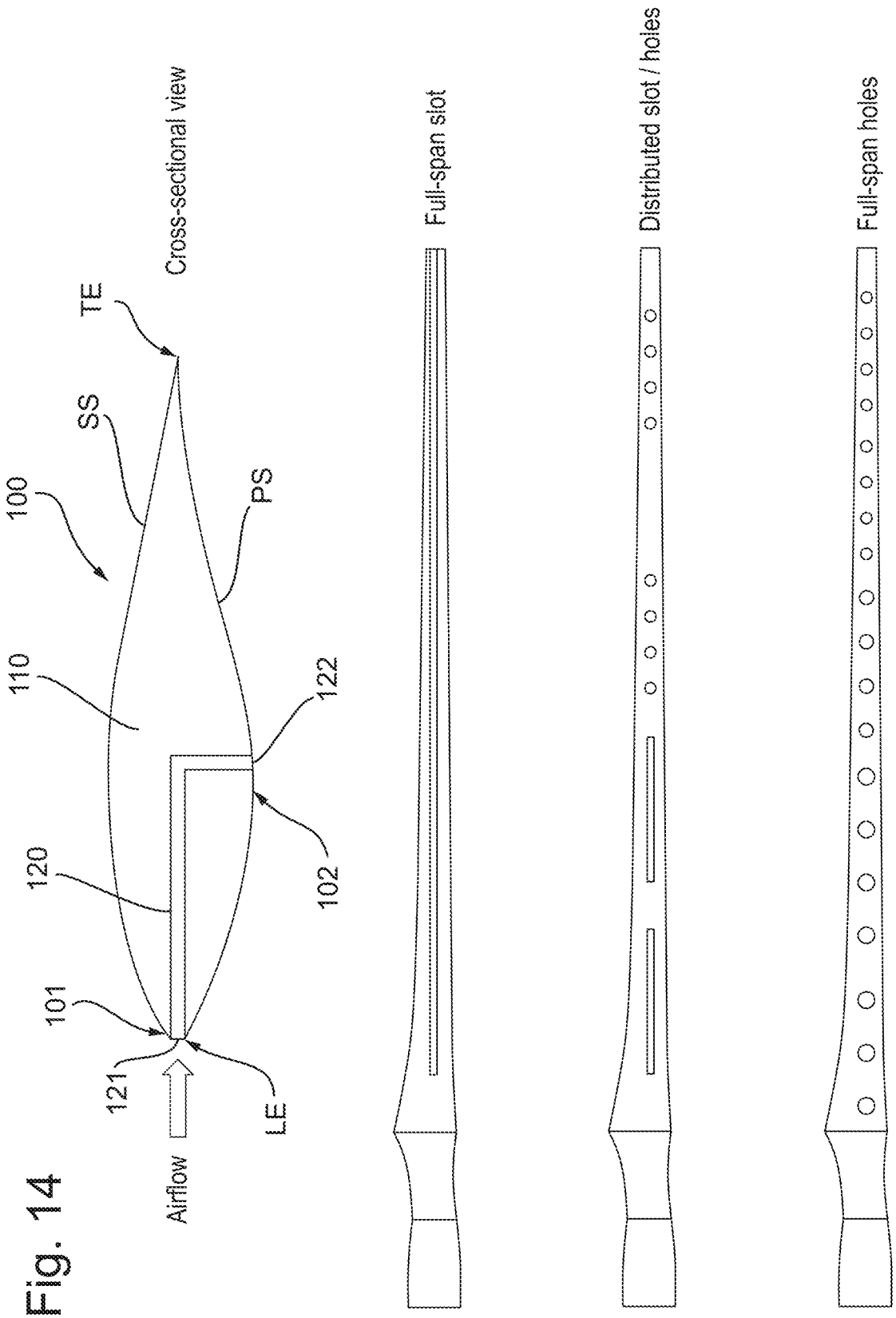

WIND TURBINE BLADE HAVING AIR PASSAGE WITH AIR CLEANING MEMBER

TECHNICAL FIELD

The present invention is related to the technical field of wind turbine blades, in particular blades for wind turbines for power generation.

BACKGROUND

The growing exploitation of natural resources in the past centuries has resulted in severe environmental pollution. There is a heightened concern for shift to renewable energy sources. Wind is one of the promising renewable energy sources, and the cost of production of wind energy has been decreasing as a result of continuous innovation and development.

At the same time, air pollution from various sources is a serious health hazard. It is linked to nearly 24% (8 million) of the global deaths/year. Particulate matters (PM) are ambient microscopic airborne particles of grave concern. These fine particles can be difficult to filter. They are inhaled by humans and get absorbed into the bloodstream, leading to devastating health risks and implications. In particular, PM2.5 exposure is linked to an estimated 4.2 million worldwide deaths per year. Since the COVID-19 pandemic, which attacks the human respiratory and cardiovascular systems, it has been estimated that 7%-13% of the total deaths due to COVID-19 infection are attributable to chronic air pollution exposure from anthropogenic emissions. It is further estimated that 92% of the world population is exposed to harmful levels of PM2.5 pollution.

It is thus an object of the invention to address the health effects of air pollution.

It is another object of the invention to improve the efficiency of wind energy generation.

SUMMARY

According to an embodiment of the present invention, there is disclosed a wind turbine blade having a body having a pressure surface and a suction surface; the wind turbine blade further comprising: an air passage traversing the body, the air passage having an entrance opening and an exit opening; and an air cleaning member provided within the air passage.

The entrance opening may be on the pressure surface, and the exit opening may be on the suction surface.

The air cleaning member may comprise an air filter configured to remove particulate matters suspended in air flowing therethrough.

The air filter may be configured to remove PM10 particulate matters.

The air filter may be configured to remove PM2.5 particulate matters.

The air filter may have a mesh size of about 200 nm.

The air cleaning member may comprise a catalytic converter.

The catalytic converter may be configured to reduce a concentration of an air pollutant present in air flowing through the catalytic converter. The air pollutant may comprise at least one of ozone, nitrogen dioxide and sulphur dioxide.

The air passage may be configured to passively direct air from the entrance opening to the exit opening, thereby re-energising a boundary layer in downstream air flow on the suction surface.

A chordwise position at which the exit opening is provided may be the same as or further from a leading edge of the wind turbine blade than a chordwise position at which the entrance opening is provided.

The chordwise position of the entrance opening may be no more than 0.5 times a chord length of the wind turbine blade measured from the leading edge.

The chordwise position of the entrance opening may be at least 0.2 times the chord length of the wind turbine blade measured from the leading edge.

The chordwise position of the exit opening may be at least 0.2 times a chord length of the wind turbine blade measured from the leading edge.

The chordwise position of the exit opening may be no more than 0.5 times the chord length of the wind turbine blade measured from the leading edge.

The air passage may comprise a plurality of through-holes distributed spanwise along the wind turbine blade.

A root end of the air passage may be positioned at a spanwise position at least 0.3 times a length of the wind turbine blade measured from a blade root of the wind turbine blade.

There is also disclosed a wind turbine blade comprising: an air passage provided within the wind turbine blade and configured to passively direct air from a first surface of the wind turbine blade to a second surface of the wind turbine blade; and an air cleaning member provided within the air passage.

There is also disclosed a wind turbine rotor comprising a plurality of wind turbine blades, wherein each of the wind turbine blades comprises: a body having a pressure surface and a suction surface; an air passage traversing the body, the air passage having an entrance opening and an exit opening; and an air cleaning member provided within the air passage.

The wind turbine rotor may be a vertical-type rotor.

The wind turbine rotor of may be a horizontal-type rotor.

LIST OF FIGURES

FIG. 5 shows a wind turbine blade with an arrangement of an air passage formed of a single slot spanning the full length of the blade.

FIG. 6 shows a wind turbine blade with an arrangement of an air passage formed of a plurality of slots.

FIG. 7 shows a wind turbine blade with an arrangement of an air passage formed of a plurality of holes spanning part of the length of the blade.

FIG. 8 shows a wind turbine blade with an arrangement of an air passage formed of a plurality of holes spanning the full length of the blade.

FIG. 9 shows a wind turbine blade with an arrangement of an air passage formed of a plurality of holes provided in spanwise sections along the blade.

FIG. 10 shows a wind turbine blade with an extra air passage formed of a plurality of holes spanning the full length of the blade.

FIG. 11 shows a wind turbine blade with an extra air passage formed of a plurality of slots.

FIG. 12 shows a wind turbine blade with an extra air passage formed of a single slot spanning the full length of the blade.

FIG. 13 shows a wind turbine blade with an air passage formed of a plurality of holes and an extra air passage formed of a single slot.

FIG. 14 shows variants of the wind turbine blade with an alternative arrangement of an air passage.

DETAILED DESCRIPTION

Figure 1:
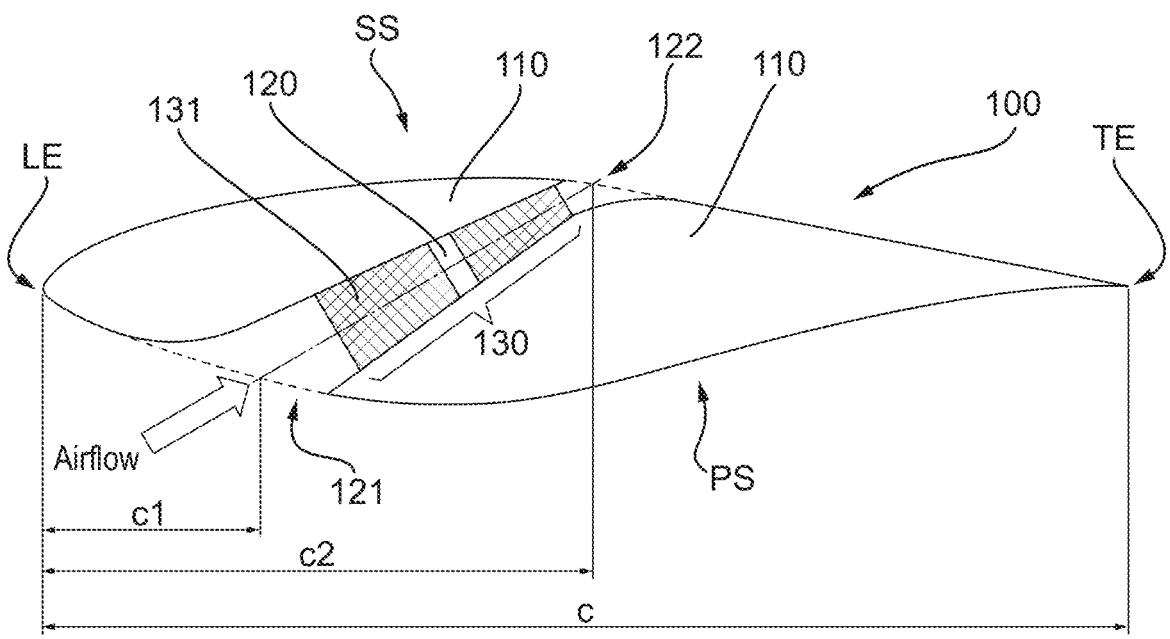
FIG. 1 shows a cross-sectional profile of a wind turbine blade in accordance with an embodiment of the present invention.

A wind turbine blade in accordance with the present invention is shown in FIG. 1. As shown, the wind turbine blade 100 has a body 110. A cross-sectional profile of the wind turbine blade 100 is shown in the figure. As shown, the body 110 of the wind turbine blade 100 has a cross-sectional profile of an aerofoil. As the wind turbine blade 100 travels through wind, aerodynamic lift may be generated. As shown in the figure, the wind turbine blade 100 has a leading edge LE and a trailing edge TE. In general, the wind turbine blade 100 is intended for air to flow from the leading edge LE towards the trailing edge TE.

As further shown in FIG. 1, the body 110 of the wind turbine blade 100 has a pressure surface PS and a suction surface SS. The contour of the pressure surface and PS and the suction surface SS may be configured in accordance with known aerodynamic principles. Specifically, the pressure surface PS and the suction surface SS may be configured so that, for a given range of angle of attack and air speed, air flowing across the suction surface SS creates a suction force, whereas air flowing across the pressure surface PS creates a pressure force. As a result, the combined forces acting on the pressure surface PS and the suction surface may result in a lift component pointing from the pressure surface PS towards the suction surface SS.

As shown in FIG. 1, an air passage 120 is provided in the body 110. As shown, the air passage 120 traverses the body 110. The air passage 120 has an entrance opening 121 and an exit opening 122. In use, airflow may enter through the entrance opening 121, through the air passage 120 and exit through the exit opening 122.

As also shown, an air cleaning member 130 is provided within the air passage 120. Therefore, as air flows through the air passage 120, some or all of the air may also flow through the air cleaning member 130. As the air flows through the air cleaning member 130, the air may be cleaned. That is, the air cleaning member 130 may reduce the concentration of at least one air pollutant present in the air as it flows through the air cleaning member 130. As a result, air leaving the exit opening 122 may be cleaner than air entering through the entrance opening 121.

In normal operation, air pressure will generally be higher on the pressure surface PS than on the suction surface SS, the entrance opening 121 may be provided on the pressure surface PS and the exit opening 122 may be provided on the suction surface SS. As a result, when the wind turbine blade 100 is in use, the air pressure difference between the entrance opening 121 and the exit opening 122 may cause air to flow through the air passage 120. In particular, this air flow through the air passage 120 may be generated passively i.e. without any source of active propulsion. More specifically, the airflow through the air passage 120 may be generated without the use of any external energy source, e.g. an air compressor, a compressed air tank, or the like. The airflow through the air passage 120 may arise purely as a result of the air pressure difference between the pressure surface PS and the suction surface SS which are required for the wind turbine blade 100 to generate aerodynamic lift.

Figure 2:
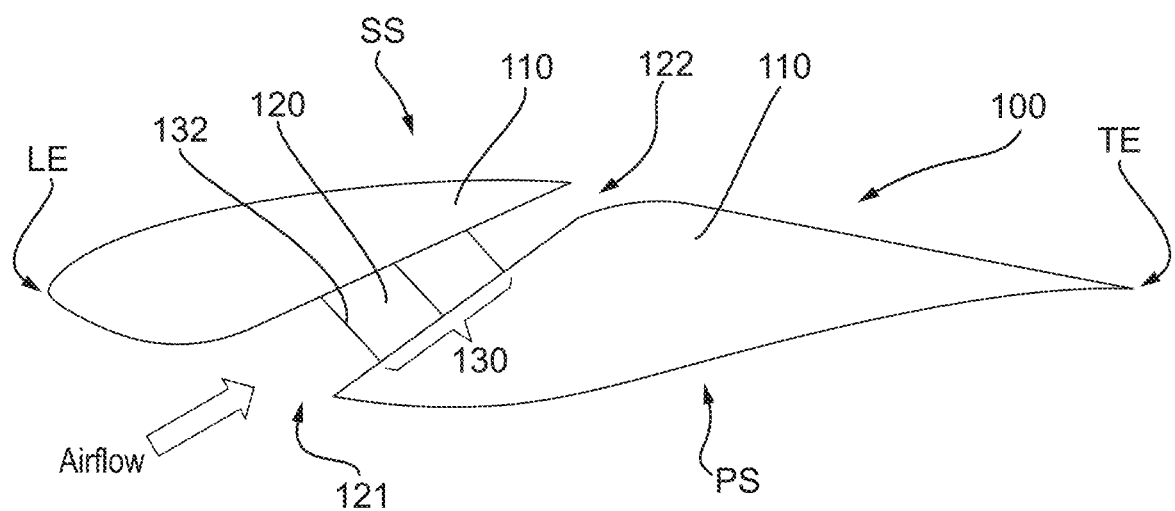
FIG. 2 shows a cross-sectional profile of a wind turbine blade in accordance with an embodiment of the present invention.
Figure 3:
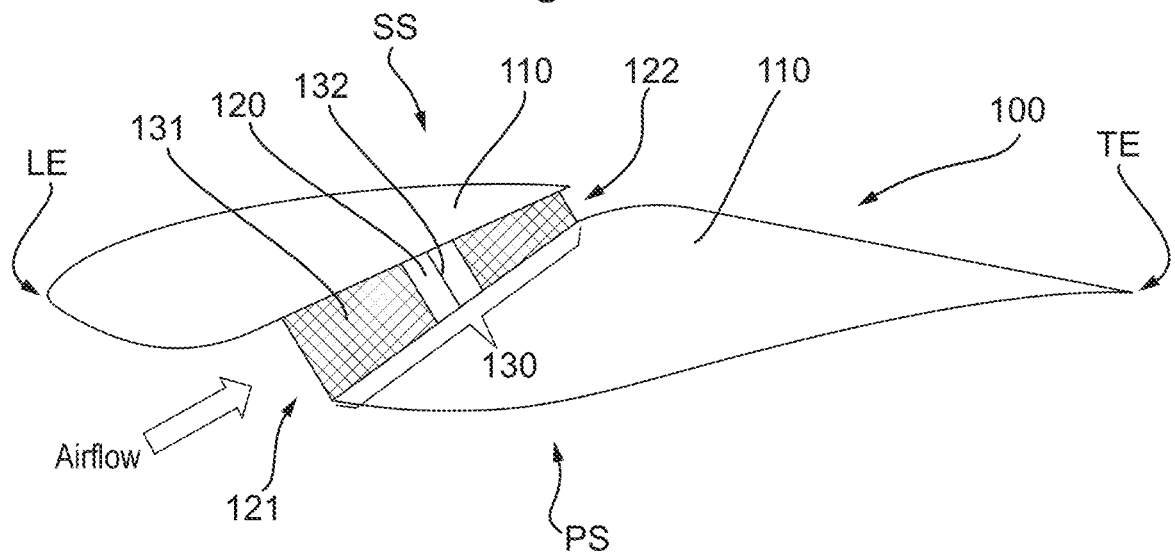
FIG. 3 shows a cross-sectional profile of a wind turbine blade in accordance with an embodiment of the present invention.

The air cleaning member 130 may comprise an air filter 131, 132. The air filter 131, 132 may be configured to remove particulate matters suspended in the air flowing through the air passage 120. FIGS. 1 to 3 show different forms of air filters 131, 132, and different possible arrangements of air filters 131, 132.

As shown in FIG. 1, the air filter 131 may comprise a porous medium. FIG. 1 shows two such air filters 131 forming the air cleaning member 130. However, it is to be understood that a single air filter 131 may serve as the air cleaning member 130. The air cleaning member 130 may contain any number of air filters 131 as required. The air filter 131 may be of a porous medium type. An air filter 131 of the porous medium type may provide a large surface area for interacting with the air flowing through the air cleaning member 130, which may result in effective air cleaning.

FIG. 2 shows another type of air filter 132, which is in the form of a film or sheet. Although FIG. 2 shows an air cleaning member 130 comprising three air filters 132 of the film/sheet type, it is to be understood that any number of air filters 132 may be provided. For example, a single air filter 132 of the sheet/film type may be provided. Air filters 132 of the sheet/film type may be advantageous in terms of lower production cost, and a potentially smaller weight.

As shown in FIG. 3, a mixture of air filters of different types may also be used. As shown in FIG. 3, two air filters 131 of the porous medium type are provided, and a further air filter 132 of the sheet/film type may be provided between the two air filters 131 of the porous medium type. It is to be understood that different combinations and different numbers of air filters 131, 132 of different types may be used to construct the air cleaning member 130 as required.

As noted above, the air filter 131, 132 may be configured to remove particulate matters suspended in the air flowing through the filter. In particular, the air filter 131, 132 may be configured to remove one or both of PM 10 and PM 2.5 particulate matters. For example, the air filter 131, 132 may have a microstructure that features a controlled surface chemistry that enables the filtration of particulate matters.

For example, the air filter 131, 132 may have a filtration rate of PM 10 particulate matters of at least 30%, at least 40%, at least 50%, at least 60%, at least 70%, at least 80%, at least 90% or at least 95% or more.

The air filter 131, 132 may additionally or alternatively have a filtration rate of PM 2.5 particulate matters of at least 30%, at least 40%, at least 50%, at least 60%, at least 70%, at least 80%, at least 90%, at least 95% or more.

In one implementation, the air filter 131, 132 is in the form of a mesh. The air filter 131, 132 may have a mesh size of about 1,000 nm or less, 800 nm or less, 600 nm or less, 400 nm or less or 200 nm or less. This may enable effective filtration of PM 10 and/or PM 2.5 particulate matters.

For completeness, it is noted that the designation "PM 10" refers to particulate matters having a particle diameter of 10 micrometres or less, and "PM 2.5" refers to particulate matters having a particle diameter of 2.5 micrometres or less. The concentrations of PM 10 and PM 2.5 particulate matters may be measured using one or more known methods, including the gravimetric method or using optical particle counters.

The choice of air filter specification may depend on the air quality of a geographic location where the wind turbine blade 100 is to be deployed. For example, depending on the sources of air pollutants in the geographic region, such as private cars, heavy diesel vehicles, aeroplanes, gas/oil/coal power plants and different types of factories, the composition of air pollutants may vary.

In addition to or instead of particulate matters, the air cleaning member 130 may remove gaseous pollutants present in the air. For this purpose, the air cleaning member 130 may comprise a catalytic converter. The catalytic converter may at least partially remove (i.e. to reduce the concentration of) an air pollutant in the air flowing through the catalytic converter. The catalytic converter may reduce the concentration of the air pollutant by converting it into a less harmful substance. For example, the catalytic converter may be effective for reducing the concentration of a hazardous gas in the air, such as one or more of ozone, nitrogen dioxide and sulphur dioxide. Any suitable off-the-shelf catalytic converter may be used.

As noted above, the entrance opening 121 of the air passage 120 may be provided on the pressure surface PS, and the exit opening 122 may be provided on the suction surface SS. In addition to taking advantage of the natural air pressure difference between the pressure surface PS and the suction surface SS for generating an airflow through the air passage 120, the air passage 120 may serve an additional purpose of providing boundary layer blowing. Furthermore, as noted above, the direction of air from the pressure surface PS to the suction surface SS may be achieved passively, i.e. without the use of an external energy source.

That is, by directing air from the pressure surface PS to the suction surface SS, the airflow through the air passage 120 may be directed to re-energise a boundary layer on the suction surface SS situated downstream to the exit opening 122. In other words, the air passage 120 may direct the relatively high-energy air from the pressure surface PS to the boundary layer on the suction surface SS where the energy in the airflow is relatively low. Directing air from the pressure surface PS to the suction surface SS may therefore increase the energy in the boundary layer airflow on the suction surface SS downstream of the exit opening 122.

This re-energisation of the boundary layer on the suction surface SS is also known as "boundary layer blowing". An effect of boundary layer blowing is that flow separation on the suction surface SS may be delayed. As is well-understood, absent any intervention, a boundary layer tends to transition into turbulent flow at a certain distance downstream to the leading edge LE, and flow separation is observed. Severe flow separation causes the wind turbine blade 100 to lose lift, i.e. it stalls.

Wind turbine blades 100 are particularly prone to stalling when a high angle of attack is used. In particular, when wind speed is high, more energy in the wind is available for extraction. However, a higher angle of attack is generally needed to increase the amount of energy extracted from the wind. In known wind turbine blades, the amount of energy that can be extracted from the wind is often limited by the angle of attack at which excessive flow separation on the suction surface SS occurs.

As is well-understood, the phenomenon of flow separation is due to the reduction of total pressure (i.e. energy) in the air flow on the suction surface SS as it flows from the leading edge LE to the trailing edge TE. In general, as the angle of attack increases, the point at which flow separation occurs shifts towards the leading edge LE. If the angle of attack is increased excessively, flow separation on the suction surface may be so severe that a sudden drop in the amount of lift generated can be observed. In other words, the wind turbine blade may stall.

Therefore, by re-energising the boundary layer on the suction surface SS, the airflow on the suction surface SS may be able to adhere to the suction surface SS for longer, thereby delaying the onset of flow separation and delaying the onset of aerodynamic stall. As a result, with the air passage 120, in high-wind conditions, it may be possible to increase the angle of attack of the wind turbine blade 100 to a greater angle than if a wind turbine blade without boundary layer blowing is employed. As a result, the boundary layer blowing mechanism may allow a greater amount of lift to be generated from high-wind conditions, and a greater amount of energy can be extracted from the wind.

As shown in FIGS. 1 to 3, the exit opening 122 may be downstream to the entrance opening 121 in terms of chordwise positions. That is, the chordwise position c2 at which the exit opening 122 is provided may be further from a leading edge LE of the wind turbine blade 100 than the chordwise position c1 at which the entrance opening 121 is provided. More precisely, the chordwise distance c2 between the exit opening 122 and the leading edge LE may be greater than the chordwise distance c1 between the entrance opening 121 and the leading edge LE.

As shown in FIG. 1, the chordwise positions c1 and c2 may be measured at the respective centre points of the entrance opening 121 and the exit opening 122. More specifically, the chordwise position c1 of the entrance opening 121 may be defined by the intersection between a centre line running through the air passage 120 and the surface of the pressure surface PS. Correspondingly, the chordwise position c2 of the exit opening 122 may be defined by the intersection between a centre line running through the air passage 120 and the surface of the suction surface SS.

In other words, the air passage 120 may have a general orientation that is pointing from the leading edge LE to the trailing edge TE. As a result, the air exiting the exit opening 122 may meet the airflow on the suction surface SS at an acute angle. This may enhance the performance of boundary layer blowing.

Alternatively, the exit opening 122 and the entrance opening 121 may be at the same chordwise position. In such an arrangement, the air passage 120 may be substantially perpendicular to the chord line (i.e. it may be non-slanted). This arrangement may be particularly suitable when the entrance and exit openings 121, 122 are close to the leading edge LE or trailing edge TE.

Depending on the angle of the air passage 120 and the profile of the suction surface SS, the air exiting the exit opening 122 may meet the airflow on the suction surface SS at up to about 90 degrees. For example, the air passage 120 may be perpendicular to the chord line, and the air passage 120 may meet the suction surface (at the exist opening 122) at right angle.

More specifically, as shown in FIG. 1, the chordwise position c1 of the entrance opening 121 may be expressed as a fraction of the total chord length c of the wind turbine blade. As shown, the chord length c is a straight-line distance between the leading edge LE and the trailing edge TE. As shown, the chordwise position c1 of the entrance opening 121 may be measured from the leading edge LE as a fraction of the chord length c.

For example, the chordwise position c1 of the entrance opening 121 may be no more than 0.5 c. The chordwise position c1 of the entrance opening 121 may be located at the leading edge LE (c1=0) or at some fraction of the chord length c. The chordwise position c1 of the entrance opening 121 may be 0.5 c, 0.4 c, 0.3 c, 0.2 c, 0.1 c or 0 c as measured from the leading edge LE.

Correspondingly, the chordwise position c2 of the exit opening may also be expressed as a fraction of the chord length c of the wind turbine blade 100 measured from the leading edge LE. The chordwise position c2 of the exit opening 122 may be at least 0.2 c measuring from the leading edge LE. The chordwise position c2 of the exit opening 122 may be located at or close to the trailing edge TE (c2=c) or at some fraction of the chord length c. For example, the chordwise position c2 of the exit opening 122 may be 0.2 c, 0.3 c, 0.4 c, 0.5 c, 0.6 c, 0.7 c, 0.8 c, 0.9 c or 1.0 c measured from the leading edge LE. As noted above, the chordwise position c2 of the exit opening 122 may be greater than or equal to the chordwise position c1 of the entrance opening 121.

As noted above, FIG. 1 shows a cross-section of the wind turbine blade 100, and the above disclosure relating to the chordwise positions c1, c2 refers to the cross-sectional profile of the wind turbine blade 100 shown in FIG. 1. It is to be understood that the chordwise positions c1, c2 need not be uniform throughout the length of the air passage 120 in the spanwise direction of the wind turbine blade 100.

Indeed, it is often the case the chord length c of the wind turbine blade 100 is non-constant in the spanwise direction of the wind turbine blade 100. As a result, even if the non-dimensional ratios c1/c and c2/c, are constant at different spanwise positions of the air passage 120, the absolute values of c1 and c2 may be non-constant and may instead vary in proportion with the chord length c at different spanwise positions. It is further possible that the ratios c1/c and/or c2/c are non-constant. In this scenario, the relationship between c1, c2 and c may still follow the relationship disclosed above at some or all of the spanwise positions along the wind turbine blade 100.

The air passage 120 may have different spanwise lengths. For example, as shown in FIG. 4, the air passage 120 may have a span which is a fraction of the total span s of the wind turbine blade 100.

Figure 4:
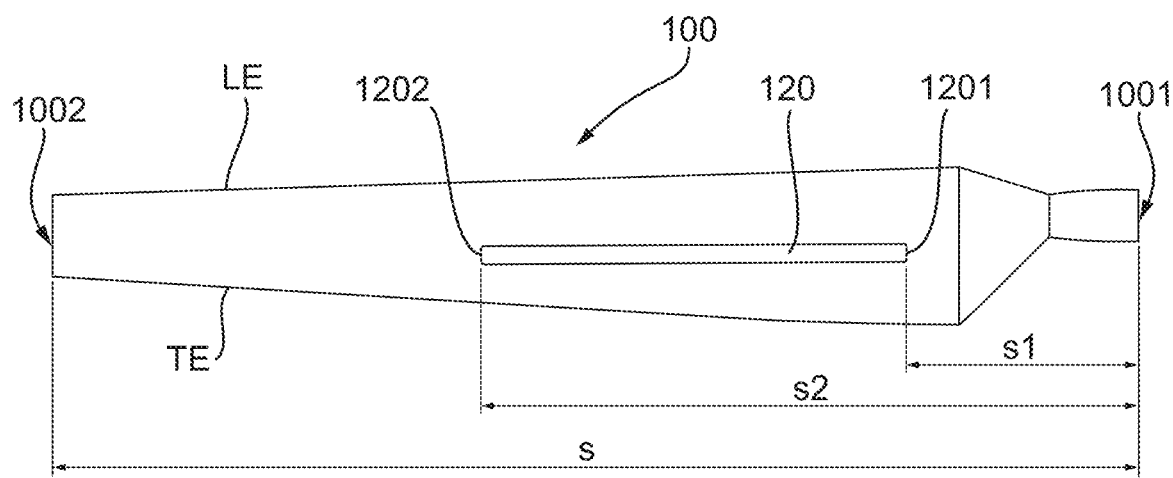
FIG. 4 shows a wind turbine blade with an arrangement of an air passage formed of a single slot spanning part of the length of the blade.

As shown in FIG. 4, the spanwise length s of the wind turbine blade 100 may be defined as the distance between the blade root 1001 and the blade tip 1002. The positions of the blade root 1001 and the blade tip 1002 may be defined as the extreme points of the entire wind turbine blade 100, which may include an aerodynamic portion and a non-aerodynamic portion (e.g. a portion for attachment to a rotor hub).

As shown in FIG. 4, the air passage 120 may have a slot shape. The air passage 120 may have a root end 1201 and a tip end 1202. As shown, the root end 1201 is situated at a distance s1 measuring from the blade root 1001. Correspondingly, the tip end 1202 is situated at distance s2 measuring from the blade root 1001. Each of s1 and s2 may be expressed as a fraction of the spanwise length s of the wind turbine blade 100. s1 and s2 may take any value between 0 and s as long as s1 is less than s2.

For example, the spanwise position s1 of the root end 1201 of the air passage 120 may be at least 0.3 s measured from the blade root 1001 of the wind turbine blade 100. Other possible values of s1 are possible, such as 0.1 s, 0.4 s, 0.5 s, 0.6 s, 0.7 s, 0.8 s, 0.9 s or 0.95 s. For example, a small slot may be placed close to the blade tip so that s1=0.95 s and s2=s. The root end 1201 of the air passage may alternatively be coterminous with the blade planform (i.e. coterminous with the root-side edge of the aerodynamic portion of the blade).

As shown in FIG. 4, the length of the air passage 120 may be defined by s2−s1. As such, the tip end 1201 of the air passage 120 may be positioned such that s2 is greater than s1.

Possible values of s2 includes 0.3 s, 0.4 s, 0.5 s, 0.6 s, 0.7 s, 0.8 s and 0.9 s. The tip end 1202 of the air passage 120 may extend to be coterminous with the blade tip 1002 (i.e. s2=s).

In the implementation shown in FIG. 5, the air passage 120 is one continuous slot that spans the entire length of the blade planform (or aerodynamic portion) of the wind turbine blade 100.

Although one air passage 120 is shown in FIGS. 4 and 5, it is envisaged that several air passages 120a may be provided (see FIG. 6). In the implementation shown in FIG. 6, four air passages 120a are provided at different spanwise positions. As shown in FIG. 6, the air passages 120a are approximately evenly distributed. Instead of providing one long air passage 120, providing several shorter air passages 120a may improve the structural strength of the wind turbine blade 100.

As shown in FIG. 6, the four air passages 120a have different sizes. Specifically, the air passages may become progressively smaller towards the blade tip 1002. It is to be understood that, where a plurality of air passages 120a is provided, the air passages 120a may all be of the same size. Furthermore, although FIG. 6 shows that the air passages 120a all have the same chordwise position (as a fraction of the chord length of the wind turbine blade 100) at each spanwise position, the chordwise positions of the air passages 120a may vary.

As an alternative to slots, the air passages 120a may instead comprise holes. As shown in FIG. 7, the wind turbine blade 100 is provided with a plurality of air passages 120a in the shape of circular holes. As used herein, whereas a "slot" may refer to an elongate shape, a "hole" may refer to an opening of approximately equal length and width. Although circular holes are shown in FIG. 7, holes of other shapes can be used instead. For example, the air passages 120a may have a substantially square or rectangular cross-section.

As shown in FIG. 7, the plurality of air passage 120a may be provided at different spanwise positions along the wind turbine blade 100. For example, as shown in FIG. 7, the air passages 120a may be distributed within a partial range of the total span length s of the wind turbine blade 100. More specifically, as shown, the air passages 120a may be distributed along the half of the span of the wind turbine blade 100 closer to the blade root 1001.

Alternatively, as shown in FIG. 8, the air passages 120a may be distributed along substantially the entire span length s of the wind turbine blade 100.

An advantage of providing the plurality of air passages 120a as holes as compared with slots is that the structural strength of the wind turbine blade 100 may be improved.

Furthermore, as shown in FIG. 8, the holes forming the wind passages 120a may have a non-uniform sizing. As a result, the aerodynamic characteristics of the air passages 120a may differ from one passage to another. This may be advantageous because the effect of boundary layer blowing provided by each of the air passages 120a may have different characteristics as a function of wind speed and/or angle of attack. As such, as the wind conditions and/or the angle of attack change, the amount of boundary layer blowing provided by the plurality of air passages 120a may not vary in unison, but may vary in a staggered manner. As a result, the overall aerodynamic performance of the wind turbine blade 100 may have a smoother characteristic as wind speed and/or angle of attack change.

Alternatively, the holes forming the air passages 120a may be of a uniform size. This may be advantageous because the air cleaning member 130 provided within the air passages 120a may be standardised. This may simplify ongoing maintenance of the wind turbine blade 100, such as regular replacement of the air cleaning member 130.

As a further variation, as shown in FIG. 9, the air passages 120a may be distributed in two or more spanwise sections along the wind turbine blade 100.

In FIGS. 4 to 9, the air passages 120, 120a are shown to be aligned at approximately a constant chordwise position (as a fraction of the chord length at each spanwise position). However, as shown in FIG. 10, in addition to the air passages 120a disclosed above, extra air passages 120b may be provided. Furthermore, the extra air passages 120b may be provided at a chordwise position different from the chordwise position of the air passages 120a. As shown in FIG. 10, a number of extra air passages 120b are provided at a chordwise position further away from the leading edge LE than the air passages 120a.

Similar to the air passages 120a, the extra air passages 120b may also occupy different spanwise positions of the wind turbine blade 100, and may have a uniform or non-uniform sizing. As shown in FIG. 10, the extra air passages 120b may be formed of holes, such as circular holes.

Alternatively, as shown in FIG. 11, the extra air passages 120b may be formed of slots, such as four slots.

Another variant is shown in FIG. 12, in which the one extra air passage 120b is provided. As shown, the extra air passage 120b may be a slot spanning the entire length of the wind turbine blade 100. In the variant shown in FIG. 12, the air passages 120a are also provided as slots. In the variant shown in FIG. 12, two air passages 120a in the shape of slots are provided.

In yet another variant, as shown in FIG. 13, a plurality of air passages 120a in the shape of holes are distributed close to the leading edge LE spanning the entire length of the wind turbine blade 100, and an extra air passage 120b in the form of a slot spanning the entire length of the wind turbine blade 100 is also provided. In this variant, a large total cross-sectional area of air passages 120a, 120b may be achieved, which may enable a large volume of air to flow through the air passages 120a, 120b and therefore cleaned.

FIG. 14 shows another variant of the wind turbine blade 100 according to the present invention. In this variant, instead of directing air from the pressure surface PS to the suction surface SS, the air passage 120 is configured to direct air from a first surface 101 to a second surface 102 of the body 110 of the wind turbine blade 100. The air passage 120 may be configured such that air is directed from the first surface 101 to the second surface 102 passively i.e. without the use of an external energy source.

For example, as shown in FIG. 14, the air passage 120 may connect a region near the leading edge LE to a region of the surface of the body 110 of the wind turbine blade 100 where the pressure in the airflow is relatively lower. For example, as shown in FIG. 14, one end of the air passage 120 may terminate on the pressure surface PS of the wind turbine blade 100. Alternatively, the air passage 120 may terminate on the suction surface SS. In either case, because the air pressure in the leading edge LE region is likely to be the highest across the entire aerodynamic surface of the wind turbine blade 100, air may be passively directed through the air passage 120.

Similar to the variants disclosed further above, as shown in FIG. 14, in cases where the air passage 120 has an entrance opening 121 in the leading edge LE region, the air passage 120 may be provided as one continuous slot, a plurality of shorter slots, a plurality of holes, or a combination thereof.

EXAMPLE

An example implementation of the wind turbine blade 100 will now be described with reference to FIGS. 15a to 15d.

The example blade design features a slot running spanwise, across the suction and pressure surfaces of the blade. The slot is defined by diametric size, and entry/exit chordwise locations on the blade. The geometry of slot is was determined by performing parametric study using computational fluid dynamics (CFD) on the Ansys (Fluent) commercial software.

The basic design of the blade is based on a National Renewable Energy Laboratory (NREL) Phase-VI research wind turbine blade, having blade size of 5.03 m. The chord varies in size from 737 mm (root) to 300 mm (tip).

Figure 15A:
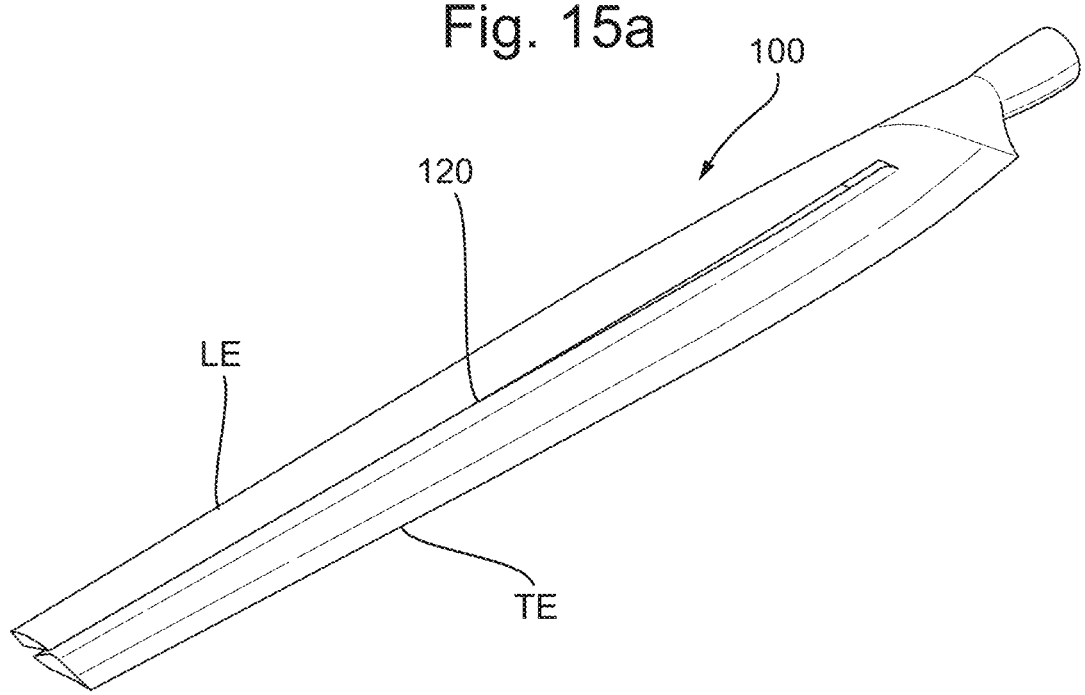
FIG. 15a shows an example implementation of a wind turbine blade.

As shown in FIG. 15a, the NREL Phase-VI blade 100 is modified to include a slot 120. The size of the slot is normalized in terms chord length c, and subjected to parametric study for the optimal dimension. The chordwise positioning and orientation of the slot are determined to provide optimal aerodynamic performance by the virtue of blowing flow-control technique.

An air filter (not shown in FIG. 15a) serving as the air cleaning member is introduced in the blade slot to evaluate the air-cleaning performance of the wind turbine blade. It performs air filtration through passive blowing across the slot. The microstructures of the filter feature a controlled surface chemistry that delivers PM2.5 filtration >95%, tested under hazardous air-quality conditions (PM2.5 concentration >250 μg/m$^3$).

The slot extends spanwise along the blade through 0.3 s to 1.0 s. The entrance opening is provided on the pressure surface at 0.2 c, and the exit opening is provided on the suction surface at 0.5 c. This arrangement is found to provide effective passive boundary layer blowing for aerodynamic performance enhancements through flow-separation suppression, and improved airflow control around the blade.

For the sake of simplicity, the parametric study is conducted at a fixed Reynolds number (Re) of 1 million to explore the optimal orientation for maximized power generation.

Figure 15B:
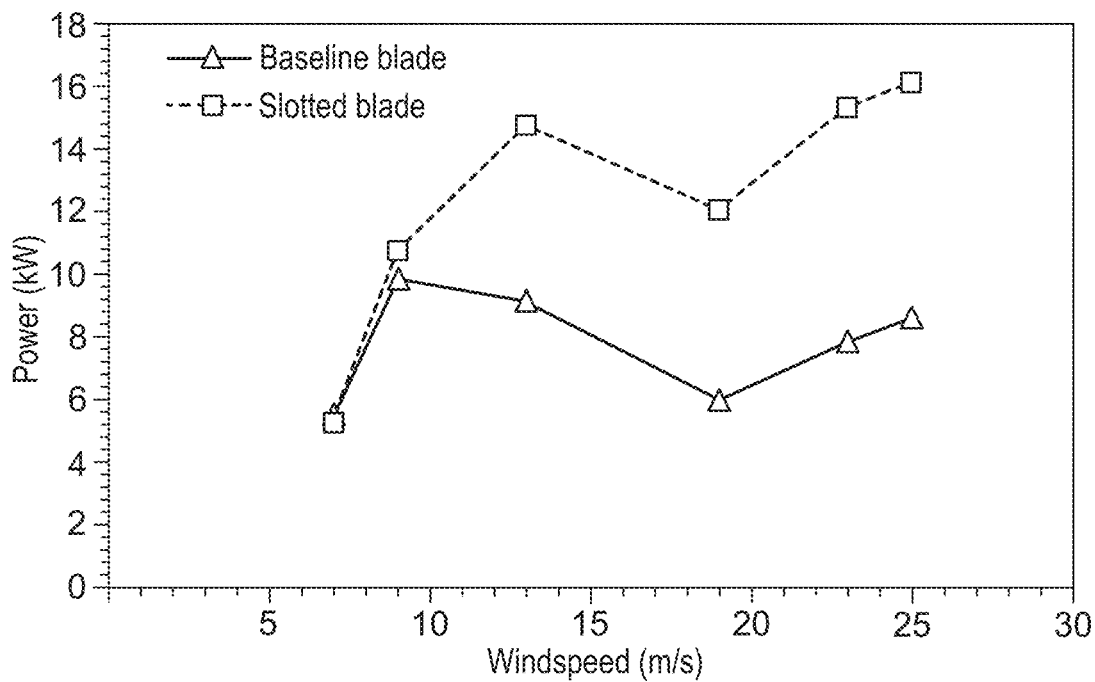
FIG. 15b shows the power generation of the wind turbine blade shown in FIG. 15a as compared with a baseline blade.
Figure 15C:
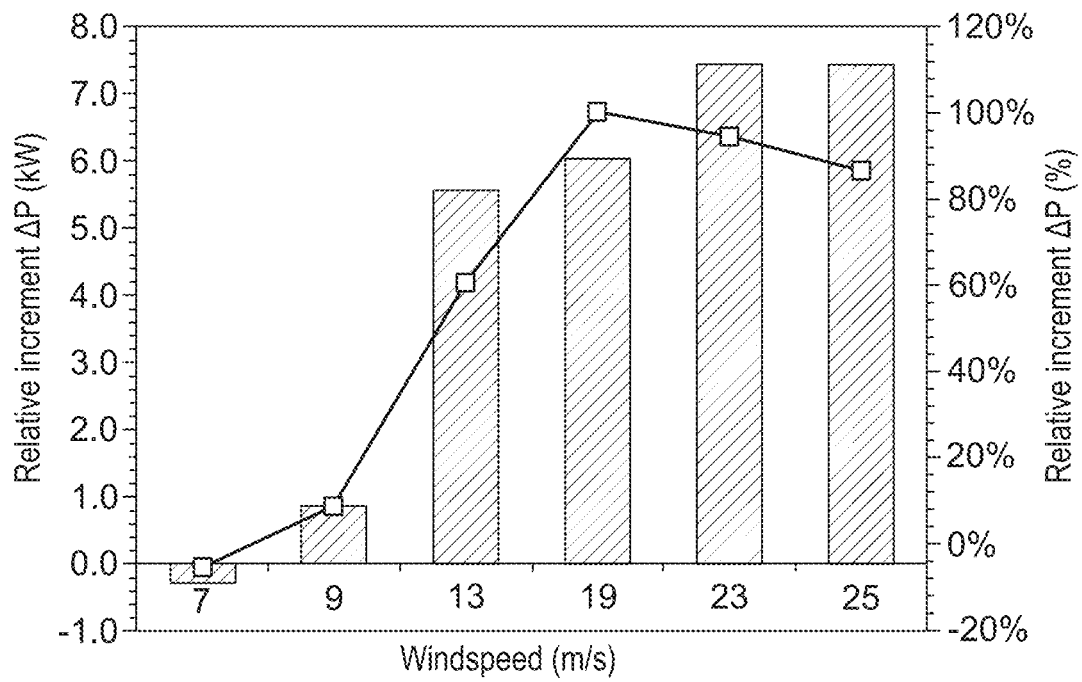
FIG. 15c shows the power enhancement (%) of the wind turbine blade shown in FIG. 15a as compared with a baseline blade.

FIG. 15b shows the power generated at different wind speed conditions achieved by slotted blade, compared to the baseline unmodified NREL Phase-IV blade. In FIG. 15c, the line plot shows the relative increase in power in percentage terms (%), whereas the bars show the relative increase in power in terms of kW. It is shown that the slotted blade achieves the largest power augmentation of 100% at the wind speed of 19 m/s (FIG. 15c), and is thus selected for further analysis.

Figure 15D:
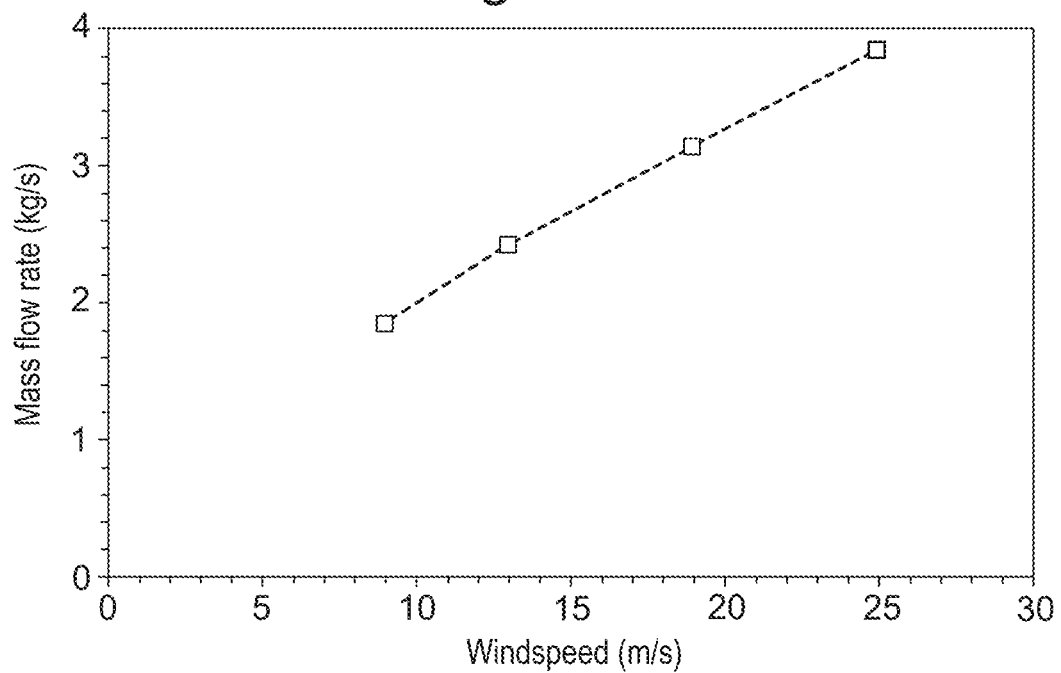
FIG. 15d shows the mass flow rate (kg/s) of the wind turbine blade shown in FIG. 15a at various wind speeds.

Next, the mass flow rate of blowing through the slot varies with the wind speed, as shown in FIG. 15d. An average mass flow rate of 3.14 kg/s is achieved at wind speed of 19 m/s, which is selected for further analysis.

The NREL Phase VI wind turbine modified with the slot is subjected to different wind speeds, ranging between its cut-in and cut-out speeds, to evaluate the performance. CFD simulations are performed at a fixed optimal rotational speed (Ω) of 72 rpm, and wind speeds (Uw) of 7, 9, 13, 19, 23 and 25 m/s. The enhancement in the power generation is attained for Uw≥9 m/s, as presented in FIG. 15c. The slot-induced passive blowing successfully enhances the torque generation which is translated to equivalent power enhancement. The maximum power increment of up to 100% is achieved at 19 m/s wind speed, as shown in FIG. 15c, which translates to a power gain of 6.02 kW.

The filtered-air volume delivered by the slot-integrated NREL Phase VI wind turbine, based on the attained mass flow rate through the carved slot, is computed as:

$$V = \frac{3.14 * 2 * 3600 * 24}{1.185} = (457{,}883.5) m^3$$

To give a sense of magnitude, the amount of air filtration performed by the wind turbines can be quantified by comparing it with human breathing. An average person inhales nearly 11 m$^3$ of air daily. This implies that a slot-integrated NREL Phase VI wind turbine may clean air equivalent to that inhaled by nearly 41,625 people daily:

$$\text{Persons} = \frac{457{,}883.5}{11} = 41{,}625$$

Although the above example uses a wind turbine blade of a relatively modest scale (10 m blade span), it is to be understood that the present invention may be implemented in larger blades as well as smaller ones. As modern wind turbine blades typically have a span in the region of 50 to 100 m, the potential volume of air cleaned and/or the amount of additional electrical power generated may be significantly greater than achieved in the above example.

FURTHER ASPECTS OF THE INVENTION

Figure 16A:
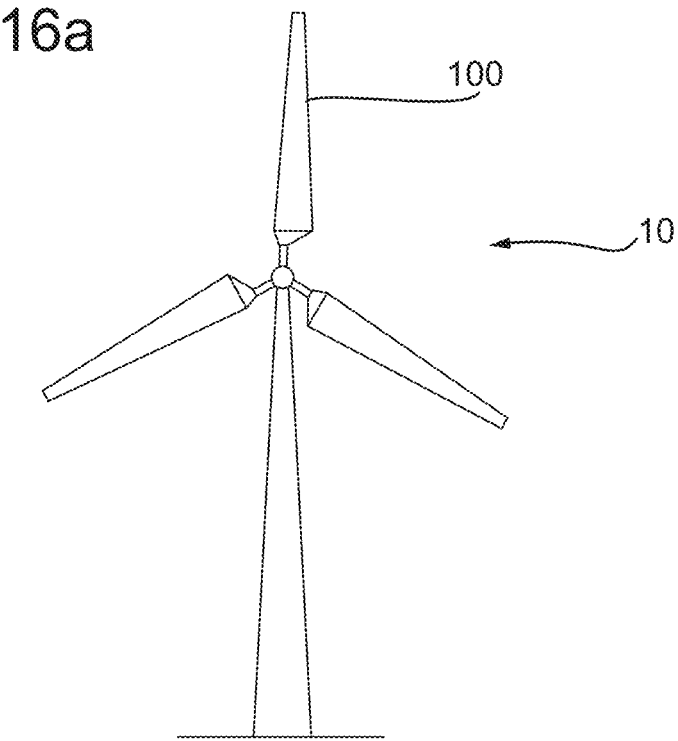
FIGS. 16a and 16b show wind turbine rotors incorporating the wind turbine blade according to an embodiment of the present invention.
Figure 16B:
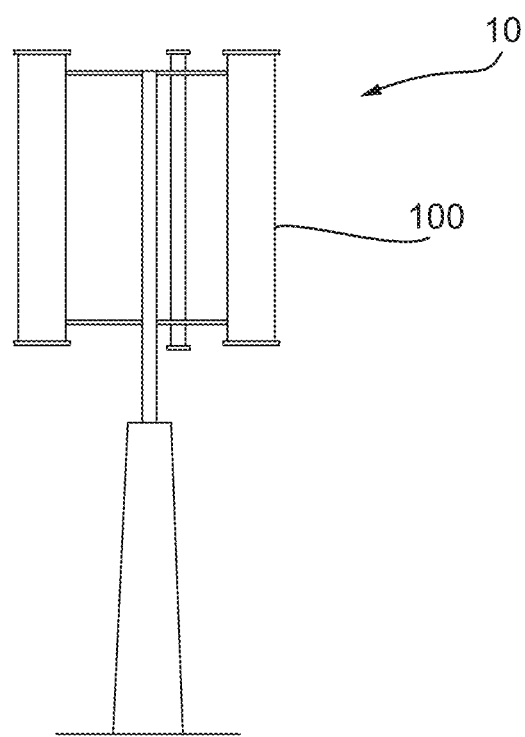

In addition to wind turbine blades 100, an aspect of the present invention is directed to a wind turbine rotor 10. As shown in FIGS. 16a and 16b, the turbine rotor 10 may comprise a plurality of wind turbine blades 100. Any of the variants of the wind turbine blades 100 disclosed above may be assembled to form a wind turbine rotor 10.

The wind turbine rotor 10 may be a horizontal-type rotor as shown in FIG. 16a, in which the axis of rotation of the wind turbine rotor 10 is approximately horizontal and the wind turbine blades 100 are arranged radially.

Alternatively, the wind turbine rotor 10 may be of a vertical-type as shown in FIG. 16b. In this type of rotor, the axis of rotation is generally vertical and the wind turbine blades 100 may be arranged around the axis of rotation in an orientation generally parallel to the axis of rotation. Although FIG. 16b shows a wind turbine rotor 10 with substantially straight wind turbine blades 100, helical wind turbine blades 100 may instead be used. Where helical wind turbine blades 100 are employed, air passages 120, 120a and air cleaning member 130 are also provided as disclosed above.

The construction and arrangement of the apparatuses as shown in the various exemplary embodiments are illustrative only. Although only a few embodiments have been described in detail in this disclosure, many modifications are possible (e.g. variations in sizes, dimensions, structures, shapes and proportions of the various elements, values of parameters, mounting arrangements, use of materials, orientations, etc.). By way of example, the position of elements may be reversed or otherwise varied and the nature or number of discrete elements or positions may be altered or varied. Accordingly, all such modifications are intended to be included within the scope of the present disclosure. Other substitutions, modifications, changes, and omissions may be made in the design, operating conditions and arrangement of the exemplary embodiments without departing from the scope of the present disclosure.

PREFERRED EMBODIMENTS

The clauses below define preferred combinations of features. The applicant reserves the right to pursue protection for the combinations of features set out in these clauses, and/or for any other subject-matter contained in the application as filed, either in the present application or in a further application divided from the present application. These clauses are not claims of the present application. The claims of the present application are set out under a separate section headed "claims".

Clause 1. A wind turbine blade (100) having a body (110) having a pressure surface (PS) and a suction surface (SS); the wind turbine blade further comprising:
an air passage (120) traversing the body, the air passage having an entrance opening (121) and an exit opening (122); and
an air cleaning member (130) provided within the air passage.

Clause 2. The wind turbine blade of clause 1, wherein the entrance opening is on the pressure surface, and the exit opening is on the suction surface.

Clause 3. The wind turbine blade of clause 1 or clause 2, wherein the air cleaning member comprises an air filter (131, 132) configured to remove particulate matters suspended in air flowing therethrough.

Clause 4. The wind turbine blade of clause 3, wherein the air filter is configured to remove PM10 particulate matters.

Clause 5. The wind turbine blade of clause 3 or clause 4, wherein the air filter is configured to remove PM2.5 particulate matters.

Clause 6. The wind turbine blade of any one of clauses 3 to 5, wherein the air filter has a mesh size of about 200 nm.

Clause 7. The wind turbine blade of any one of the preceding clauses, wherein the air cleaning member comprises a catalytic converter.

Clause 8. The wind turbine blade of clause 7, wherein the catalytic converter is configured to reduce a concentration of an air pollutant present in air flowing through the catalytic converter, the air pollutant comprising at least one of ozone, nitrogen dioxide and sulphur dioxide.

Clause 9. The wind turbine blade of any one of clauses 2 to 8, wherein the air passage is configured to passively direct air from the entrance opening to the exit opening, thereby re-energising a boundary layer in downstream air flow on the suction surface.

Clause 10. The wind turbine blade of clause 9, wherein a chordwise position at which the exit opening is provided is further from a leading edge (LE) of the wind turbine blade than a chordwise position at which the entrance opening is provided, or the exiting opening and the entrance opening are provided at the same chordwise position.

Clause 11. The wind turbine blade of clause 10, wherein the chordwise position (c1) of the entrance opening is no more than 0.5 times a chord length (c) of the wind turbine blade measured from the leading edge.

Clause 12. The wind turbine blade of clause 11, wherein the chordwise position of the entrance opening is at least 0.2 times the chord length of the wind turbine blade measured from the leading edge.

Clause 13. The wind turbine blade of any one of clauses 10 to 12, wherein the chordwise position (c2) of the exit opening is at least 0.2 times a chord length of the wind turbine blade measured from the leading edge.

Clause 14. The wind turbine blade of clause 13, wherein the chordwise position of the exit opening is no more than 0.5 times the chord length of the wind turbine blade measured from the leading edge.

Clause 15. The wind turbine blade of any one of the preceding clauses, wherein the air passage comprises a plurality of through-holes (120a) distributed spanwise along the wind turbine blade.

Clause 16. The wind turbine blade of any one of the preceding clauses, wherein a root end (1201) of the air passage is positioned at a spanwise position (s1) at least 0.3 times a length (s) of the wind turbine blade measured from a blade root (1001) of the wind turbine blade.

Clause 17. The wind turbine blade of any one of the preceding clauses, wherein a tip end of the air passage is co-terminous with the tip of the wind turbine blade.

Clause 18 The wind turbine blade of claim 1, wherein the entrance opening is at the leading edge of the wind turbine blade, and the exit opening is on the suction surface or the pressure surface.

Clause 19. A wind turbine blade (100) comprising:
an air passage (120) provided within the wind turbine blade and configured to passively direct air from a first surface (PS, 101) of the wind turbine blade to a second surface (SS, 102) of the wind turbine blade; and
an air cleaning member (130) provided within the air passage.

Clause 20. A wind turbine rotor (10) comprising a plurality of wind turbine blades (100), wherein each of the wind turbine blades is the wind turbine blade according to any one of the preceding clauses.

Clause 21. The wind turbine rotor of clause 20, being a vertical-type rotor.

Clause 22. The wind turbine rotor of clause 20, being a horizontal-type rotor.

The invention claimed is:

1. A wind turbine blade comprising:
a body having a cross-sectional profile of an aerofoil, a pressure surface, and a suction surface;
an air passage traversing the body, the air passage having an entrance opening and an exit opening; and
an air cleaning member provided within the air passage and spaced apart from the entrance opening, wherein the air cleaning member comprises a catalytic converter.

2. The wind turbine blade of claim 1, wherein the entrance opening is on the pressure surface, and the exit opening is on the suction surface.

3. The wind turbine blade of claim 2, wherein the air passage is configured to passively direct air from the entrance opening to the exit opening, thereby re-energising a boundary layer in downstream air flow on the suction surface.

4. The wind turbine blade of claim 3, wherein a chordwise position at which the exit opening is provided is the same as or further from a leading edge of the wind turbine blade than a chordwise position at which the entrance opening is provided.

5. The wind turbine blade of claim 4, wherein the chordwise position of the entrance opening is no more than 0.5 times a chord length of the wind turbine blade measured from the leading edge.

6. The wind turbine blade of claim 5, wherein the chordwise position of the entrance opening is at least 0.2 times the chord length of the wind turbine blade measured from the leading edge.

7. The wind turbine blade of claim 4, wherein the chordwise position of the exit opening is at least 0.2 times a chord length of the wind turbine blade measured from the leading edge.

8. The wind turbine blade of claim 7, wherein the chordwise position of the exit opening is no more than 0.5 times the chord length of the wind turbine blade measured from the leading edge.

9. The wind turbine blade of claim 1, further comprising an air filter configured to remove particulate matters suspended in air flowing therethrough.

10. The wind turbine blade of claim 9, wherein the air filter is configured to remove PM10 particulate matters.

11. The wind turbine blade of claim 9, wherein the air filter is configured to remove PM2.5 particulate matters.

12. The wind turbine blade of claim 9, wherein the air filter has a mesh size of 200 nm or less.

13. The wind turbine blade of claim 1, wherein the catalytic converter is configured to reduce a concentration of an air pollutant present in air flowing through the catalytic converter, the air pollutant comprising at least one of ozone, nitrogen dioxide and sulphur dioxide.

14. The wind turbine blade of claim 1, comprising a plurality of air passages, wherein each air passage comprises a hole extending between the pressure surface of the blade and the suction surface of the blade, wherein the plurality of air passages are distributed spanwise along the wind turbine blade.

15. The wind turbine blade of claim 1, wherein a root end of the air passage is positioned at a spanwise position at least 0.3 times a length of the wind turbine blade measured from a blade root of the wind turbine blade.

16. A wind turbine rotor comprising a plurality of wind turbine blades, wherein each of the wind turbine blades comprises:
a body having a cross-sectional profile of an aerofoil, a pressure surface, and a suction surface;
an air passage traversing the body, the air passage having an entrance opening and an exit opening; and
an air cleaning member provided within the air passage and spaced apart from the entrance opening, wherein the air cleaning member comprises a catalytic converter.

17. The wind turbine rotor of claim 16, being a vertical-type rotor.

18. The wind turbine rotor of claim 16, being a horizontal-type rotor.

\* \* \* \* \*